United States Patent [19]
Geohegan, Jr.

[11] Patent Number: 5,414,675
[45] Date of Patent: May 9, 1995

[54] SONAR SYSTEM FOR DETECTION OF NEAR BOTTOM TARGETS

[75] Inventor: Kenneth P. Geohegan, Jr., Catonsville, Md.

[73] Assignee: Westinghouse Electric Corporation, Pittsburgh, Pa.

[21] Appl. No.: 755,117

[22] Filed: Jul. 15, 1985

[51] Int. Cl.⁶ .......................... G01S 9/66; G01S 15/89
[52] U.S. Cl. .......................................... 367/88; 367/87; 367/93; 367/131
[58] Field of Search .................. 367/93, 87, 117, 131, 367/88; 340/850

[56] References Cited

U.S. PATENT DOCUMENTS

| | | | |
|---|---|---|---|
| 3,144,631 | 8/1964 | Lustig et al. | 367/12 |
| 3,742,436 | 6/1973 | Jones | 367/131 |
| 3,757,287 | 9/1973 | Bealor, Jr. | 367/87 X |
| 4,056,802 | 11/1977 | Rabon | 367/88 X |
| 4,068,234 | 1/1978 | O'Meara | 367/88 X |
| 4,119,938 | 10/1978 | Alais | 367/87 |
| 4,237,737 | 12/1980 | Nitadori | 73/625 |
| 4,313,184 | 1/1982 | Jarman et al. | 367/88 |
| 4,319,348 | 3/1982 | Suzuki | 367/87 |

Primary Examiner—Nelson Moskowitz

[57] ABSTRACT

Target detection apparatus wherein a pulse of acoustic energy transmitted toward a target area of the sea bottom is reflected back to two spaced-apart receiver transducers. The sum and difference of the transducer outputs are obtained with the phase relationship therebetween being detected. An acoustic return from a target above or on the bottom will cause two returns to arrive at the receiver transducers at very slightly different times and at different angles thereby resulting in a phase relationship different than a return from the bottom. An output signal indicative of a target or no target condition is provided and is normalized so that its amplitude is independent of target strength.

6 Claims, 6 Drawing Sheets

SONAR SYSTEM FOR DETECTION OF NEAR BOTTOM TARGETS

BACKGROUND OF THE INVENTION

1. Field of the Invention

The invention in general relates to sonar apparatus, and particularly to a system which is able to detect a target and classify targets as being moored above the sea bottom or lying on it.

2. Description of the Prior Art

Detection of an object, stationary in, or moving through, the water column involves the projection of acoustic energy toward the area under investigation. An object in the area will cause a distinctive detectable return of a magnitude much higher than any reverberation which may be caused by particulate matter in the water, and accordingly is detectable. Detection and classification of objects near the sea bottom, however, is more difficult because the return from the bottom itself is nearly equal in magnitude to the return from the objects themselves.

Established systems for detecting such near bottom targets require the formation of extremely narrow beams so that the shape or shadow of the object can be used in detection and classification. The formation of such narrow beams generally requires an elongated transducer arrangement which, for some underwater carriers, becomes impractical.

Although narrow beams may be utilized in the improved technique of the present invention, they are not an absolute requirement.

SUMMARY OF THE INVENTION

The present system for detecting targets on or above the bed of a body of water include acoustic transmitter means which is operable to project, periodically, a pulse of acoustic energy toward a target area of the bed. First and second receiver transducers are positioned to receive the acoustic energy reflected back from the target area, as a result of the projection, and are operable to provide corresponding respective first and second output signals. Circuitry is provided for deriving, from the first and second output signals respective sum and difference signals. The sum and difference signals are basically phase detected by multiplying them together and filtering the resultant product. The results of this phase detection are utilized to indicate the presence of a possible target and, to normalize the output signal indicative of a possible target, the filtered multiplied signal is divided by the square of the sum signal, suitably filtered.

DESCRIPTION OF THE PREFERRED EMBODIMENT

Figure 1:
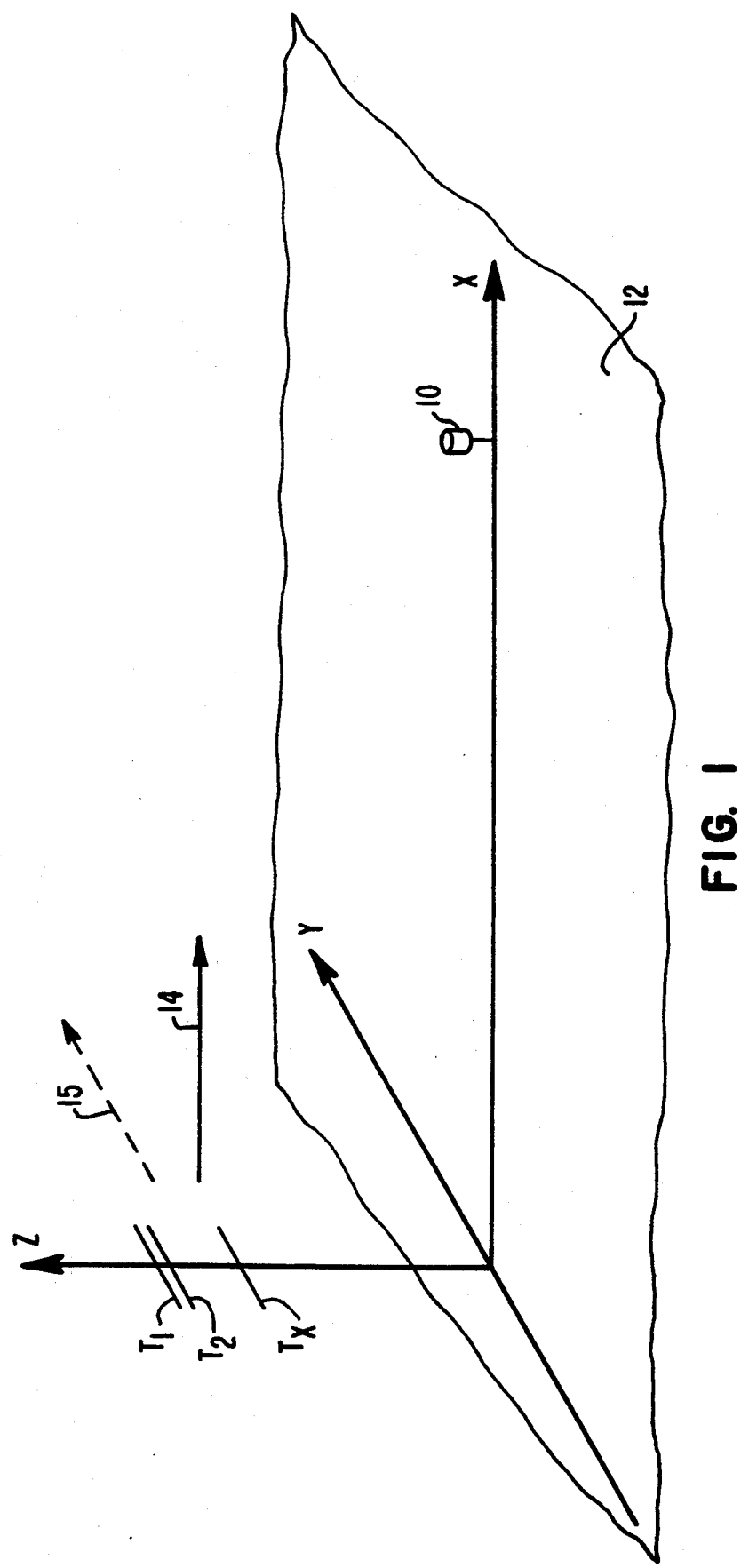
FIG. 1 illustrates transducer apparatus and a target, positioned in an XYZ coordinate system.

FIG. 1 portrays an XYZ coordinate system in which a target 10 is disposed above, and moored to, the bed of a body of water, such as sea bottom 12, disposed in the XY plane.

A transmitting transducer $T_x$ is disposed on the Z axis at a certain distance above the target area being searched. A pulse of acoustic energy transmitted toward the target area will be reflected back from the target 10 as well as the sea bottom 12, to be received by a pair of receiver transducers $T_1$ and $T_2$ located near the Z axis above the transmitting transducer. All of the transducers are mounted on an underwater carrier vehicle and periodic acoustic transmissions may take place forwardly of the apparatus as the vehicle moves in the direction of arrow 14. Alternatively, these acoustic transmissions may take place laterally of the apparatus, as in a side look sonar, as the vehicle moves in the direction of dotted arrow 15.

Figure 2A:
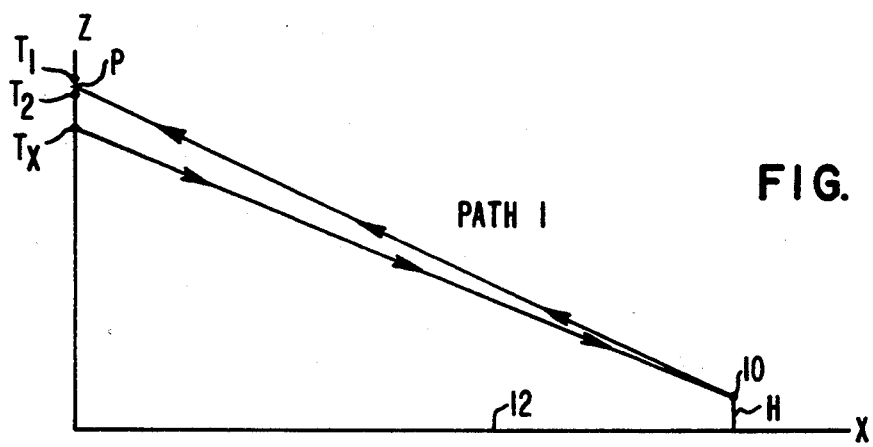
FIGS. 2A-2D illustrate paths taken by a transmitted signal, to and from the target.

As a result of the acoustic projection and impingement upon the target area, sound will be reflected back to transducers $T_1$ and $T_2$ via a number of different paths. These paths are separately shown in FIGS. 2A through 2D wherein the target 10 is represented by a single point located at a distance H above the bottom 12. The shortest path of sound travel is represented by path 1 in FIG. 2A wherein the sound projected by transmitting transducer $T_x$ strikes point 10 and returns to the receiving transducers. The return path is illustrated as terminating at a point P midway between receiving transducers.

Figure 2B:
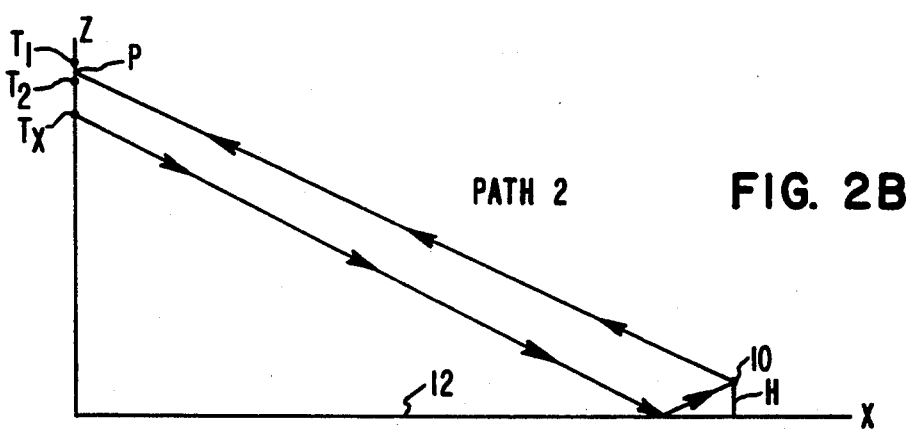
Figure 2C:
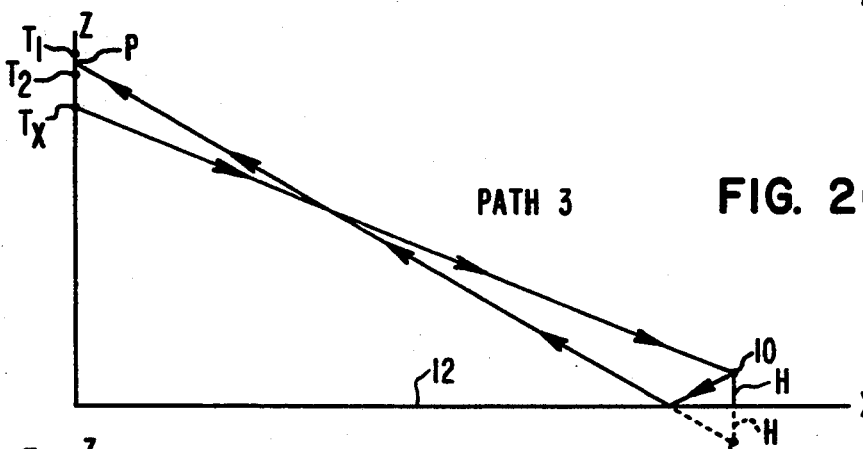

FIG. 2B illustrates the second path wherein the projected energy initially strikes the bottom 12, is reflected therefrom to point 10, and then back to point P. Path 3 in FIG. 2C is somewhat similar to path 2, however in a reverse sequence. That is, the transmitted sound initially hits point 10, is reflected therefrom to the bottom 12, and then to point P. In view of the crossover, path 3 is very slightly longer than path 2.

Figure 2D:
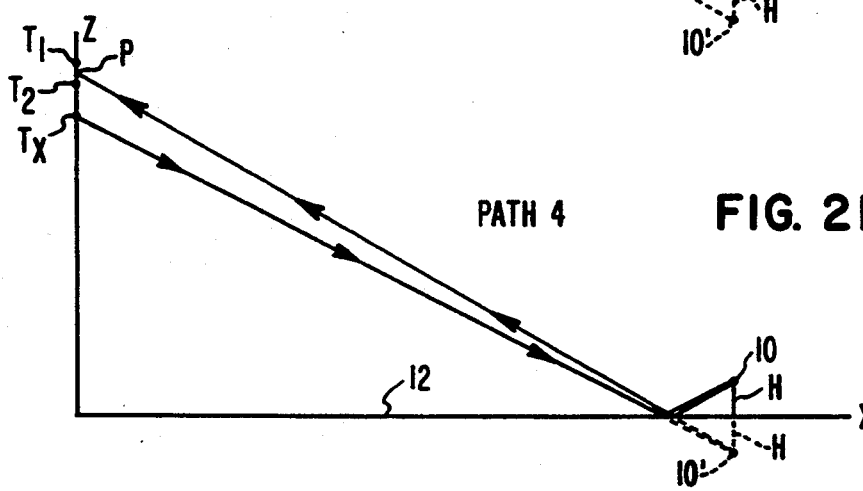

The longest path is path 4 in FIG. 2D wherein the sound in its travel from $T_x$ to point P reflects off of bottom 12, off of point 10, and again off of bottom 12.

In comparing paths 2 and 3, of FIGS. 2B and 2C, direction of the incoming sound in FIG. 2B will be indicative of a target at point 10, whereas direction of the incoming sound in FIG. 2C will be indicative of a phantom target, 10′, at a distance H below sea bottom 12.

Figure 3A:
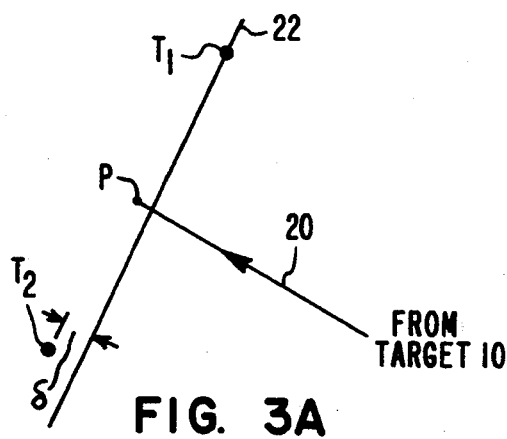
FIGS. 3A and 3B illustrate the impingement of an acoustic wave at the receiver transducers $T_1$ and $T_2$ positioned near the Z axis of FIG. 1.

In FIG. 3A, numeral 20 represents the path of acoustic energy reflected from the target along path 1 and numeral 22 represents a wave peak of the acoustic energy as it impinges upon first receiver transducer $T_1$. Transducer $T_1$ will provide a corresponding output signal and transducer $T_2$ will provide the identical output signal a short time later governed by the distance $\delta$ which in turn is a function of the angle of incidence of path 20 relative to the pair of receiver transducers. Transducers $T_1$ and $T_2$ are shown as steered mechanically toward the target area. Alternatively, they may be steered electrically by the well known technique of adding a delay at the output of transducer $T_2$. Steering the transducer pair toward the sea bottom below the target is not required but simplifies the explanation and is desirable.

In a similar fashion in FIG. 3B numeral 20' represents the path of acoustic energy reflected from the phantom target 10' along path 4, and occurring at a relatively later point in time due to the longer path length.

Figure 3B:
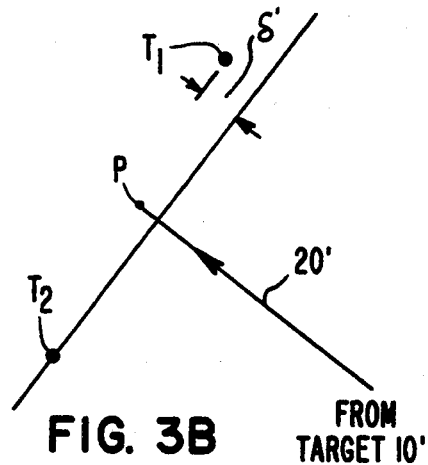
Figure 4A:
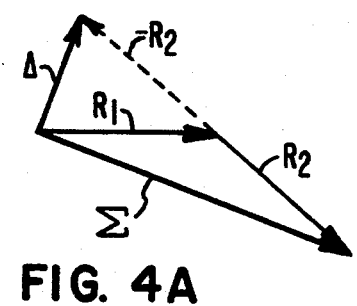
FIGS. 4A and 4B are phasor representations of the transducer signals of FIG. 3.
Figure 4B:
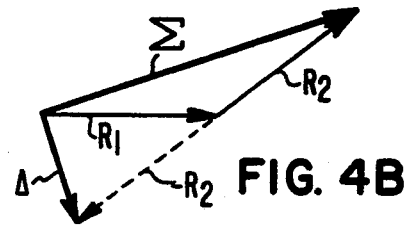

FIGS. 4A and 4B are phasor diagrams representing the output signals provided by respective receiver transducers $T_1$ and $T_2$ for the respective situations illustrated in FIGS. 3A and 3B. Phasor $R_1$ represents the output signal of transducer $T_1$ while phasor $R_2$, angularly disposed from $R_1$ by an amount governed by the distance $\delta$ (FIG. 3A) or $\delta'$ (FIG. 3B) and the speed of sound in water, represents the output of transducer $T_2$. A summation of the two signals is represented by the phasor $\Sigma$, while the difference between the signals is represented by the $\Delta$ phasor. For other than a simultaneous impingement upon $T_1$ and $T_2$ when the difference phasor is of zero amplitude, the sum and difference phasors $\Sigma$ and $\Delta$ will always be at right angles with respect to one another regardless of the impingement angle of path 20.

Figure 5:
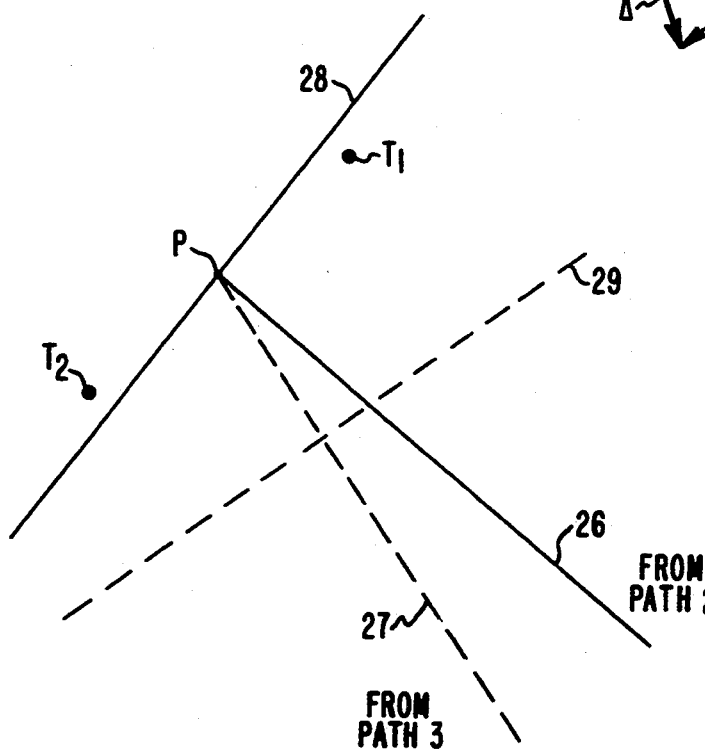
FIG. 5 illustrates the impingement upon transducers $T_1$ and $T_2$ of two signals arriving along different paths.

The path 2 and path 3 returns are received almost simultaneously so that the pulse envelopes overlap almost completely but differ in phase. This situation is depicted in FIG. 5 wherein numeral 26 represents the path 2 return (shown solid) and numeral 27 represents the path 3 return (shown dotted). Wave peaks from these returns are designated by respective numerals 28 and 29. Since path 26 ostensively comes from point 10 and path 27 from point 10' (FIGS. 2B and 2C), their respective impingement angles will be slightly different, and acoustic pressure peaks are displaced.

As was stated, path lengths 2 and 3 differ by only a small amount due to the crossover experienced in path 3. The difference D in arrival times at point P of the reflected signal of path 2 compared to that of path 3 may, to a good approximation, be represented by $$D \sim \frac{2HY}{Bc}; B >> Z,H,Y \quad (1)$$

where H is the height of the target, B the bottom range along the x direction to the target, Y the distance from the transmitting transducer to point P, Z the altitude to point P and c is the propagation velocity of sound in water.

Figure 6A:
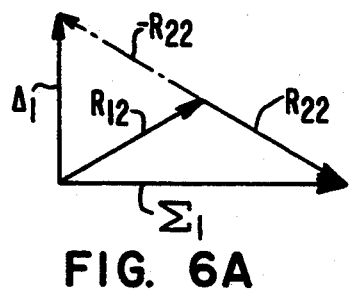
FIGS. 6A-6C are phasor diagrams illustrating the situation of FIG. 5.
Figure 6C:
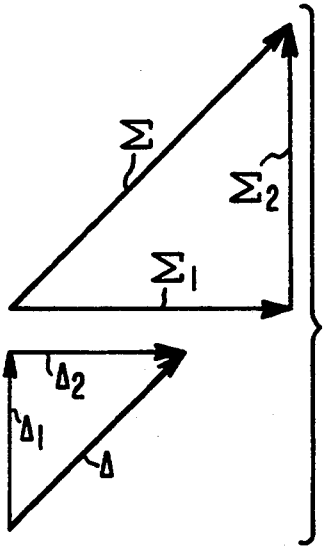
Figure 6B:
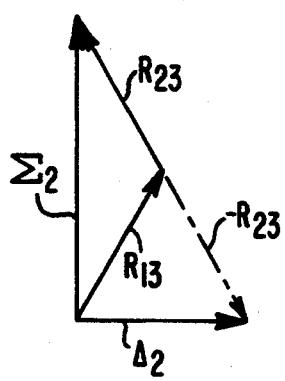

The phasor representation of signal production is illustrated in FIGS. 6A to 6C wherein the first subscript of signal phasors R represent the receiver transducer number (1 or 2) while the second subscript represents the path (2 or 3). In FIG. 6A the phasor summation of phasors $R_{12}$ and $R_{22}$ is designated $\Sigma_1$ while the difference is designated $\Delta_1$. In FIG. 6B the addition of phasors $R_{13}$ and $R_{23}$ results in $\Sigma_2$ while their difference results in $\Delta_2$. The resulting sum vector, $\Sigma$, caused by both signal paths is obtained by the phasor addition of $\Sigma_1$ and $\Sigma_2$, as in FIG. 6C which also illustrates the resultant $\Delta$ phasor obtained from adding $\Delta_1$ and $\Delta_2$. Thus, for the situation of FIG. 5, the resultant $\Sigma$ and $\Delta$ phasors, as opposed to being at right angles to one another as in FIGS. 4A, or 4B are more or less parallel to one another. By way of an example an exact parallelism would be obtained when, for a certain operating wavelength $\lambda$, the parameters of equation 1 are chosen such that the resulting difference in time of arrival, D, is equivalent to a phase shift of 90° or odd multiples thereof.

Figure 7:
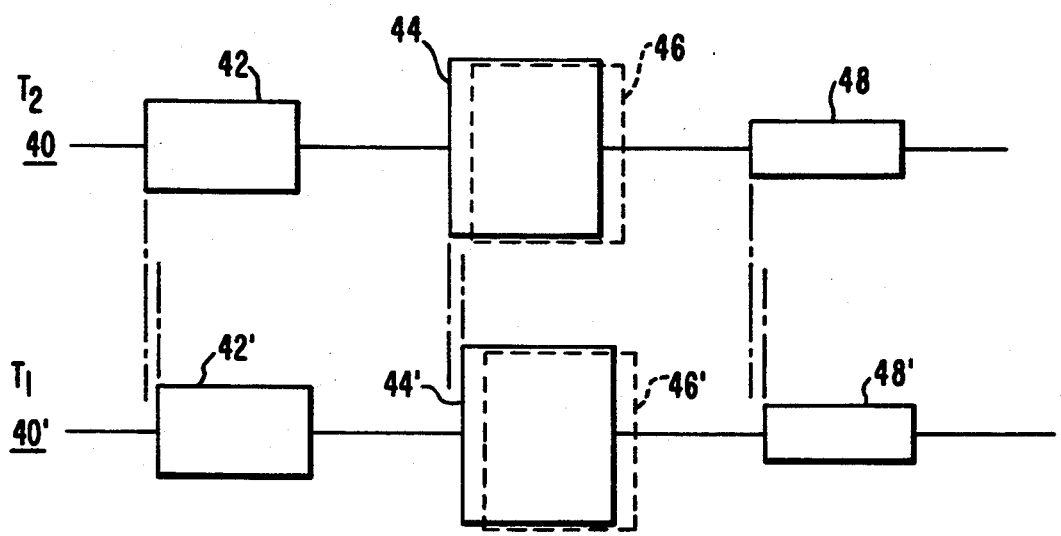
FIG. 7 are idealized waveforms illustrating the output signals provided by the transducers $T_1$ and $T_2$.
Figure 8A:
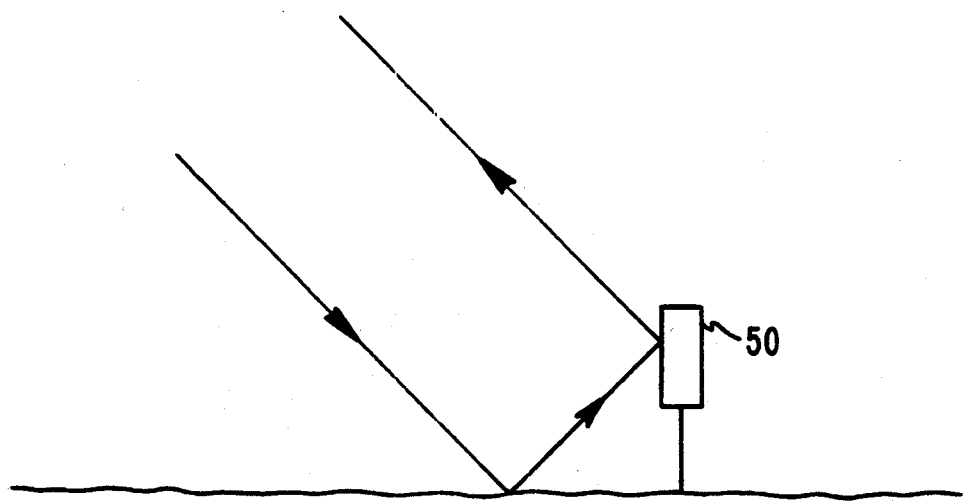
FIGS. 8A and 8B illustrate reflection from two types of targets.
Figure 8B:
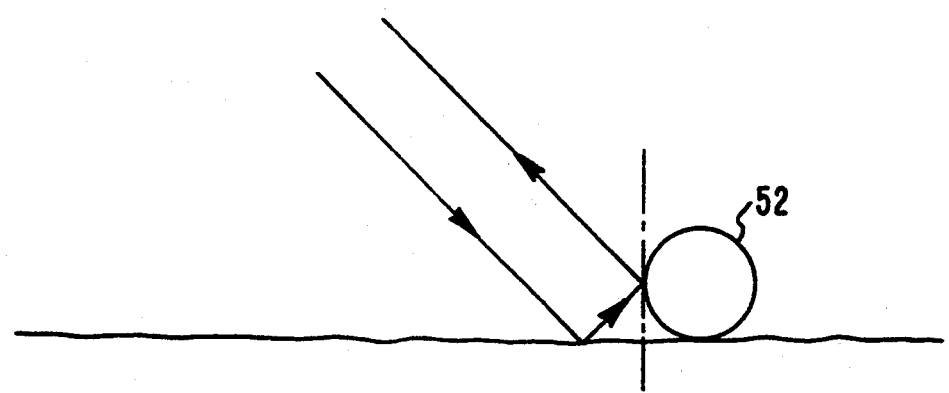

In FIG. 7 waveform 40 represents the envelope of the output provided by transducer $T_2$ while waveform 40' represents the envelope of the output provided by transducer $T_1$, as a result of the projection and subsequent reflection from the target of a single transmitted acoustic pulse. With additional reference to FIGS. 2A through 2D, pulse 42 occurs first resulting from travel along path 1 of FIG. 2A. A short time later transducer $T_1$ provides an output signal as indicated by pulse 42'. Path 2, longer than path 1, results in a pulse 44 at a point in time subsequent to the provision of pulse 42, while pulse 46, shown dotted, resulting from travel along path 3, has a simultaneously occurring overlap portion with pulse 44. The corresponding outputs from $T_1$ are represented by pulses 44' and 46'. The last generated pulses 48 and 48' from transducers $T_2$ and $T_1$ occur at a subsequent point in time since path 4 is longer than any of the other paths. It is to be noted that the waveforms of FIG. 7 are illustrated in idealized form and do not show the actual sine wave signals that are utilized, nor do they portray ever-present noise or returns from the bottom. Further, the amplitude of pulses 44 and 46, and their prime counterparts, are illustrated as having a larger amplitude than the other pulses. This may be explained with reference to FIG. 8A, showing a moored target 50 and to FIG. 8B showing a cylindrical target on the sea bottom. If the target has a vertical surface as in FIG. 8A or is tangent to a vertical plane as in FIG. 2B, then the arrangement forms a retroreflector wherein the transmitted energy is retroreflected back to the carrier vehicle.

Figure 9:
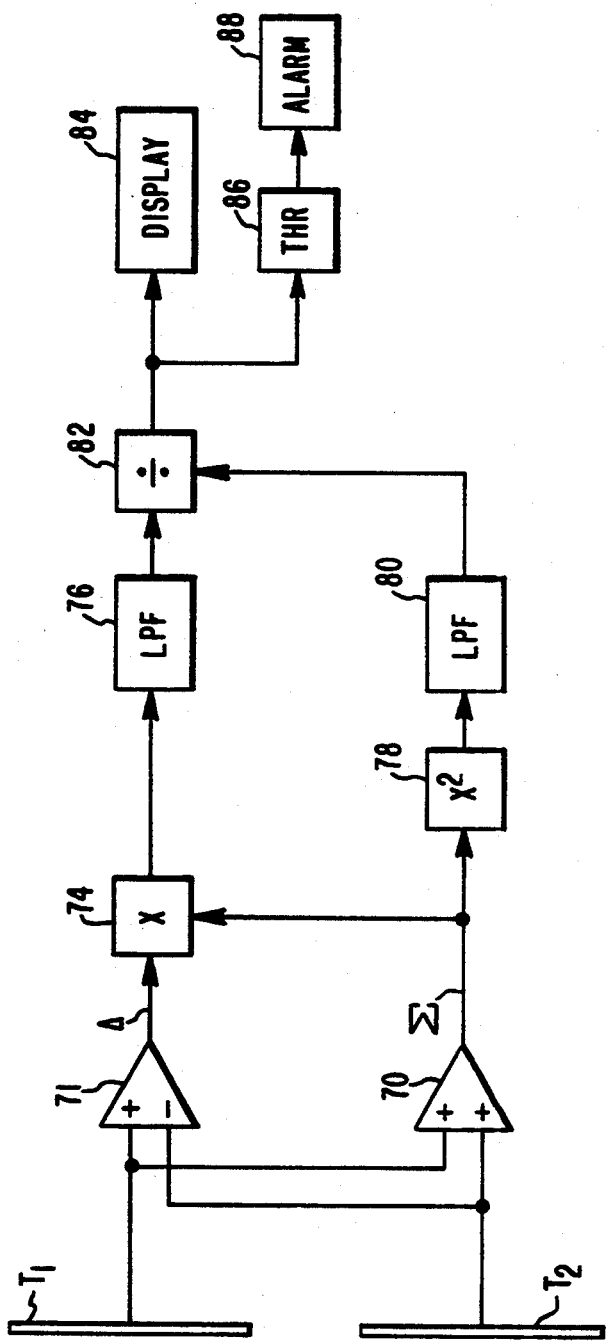
FIG. 9 is a block diagram of one embodiment of the present invention.
Figure 9:
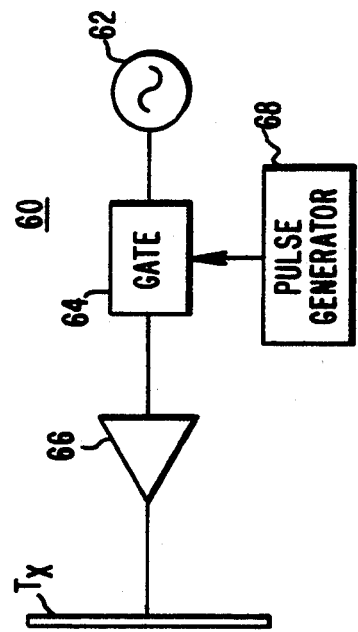

FIG. 9 illustrates one embodiment of circuitry for detecting targets such as illustrated in FIGS. 8A and 8B utilizing the principles previously discussed. The projection of an acoustic pulse is accomplished by transmitter 60 which includes an oscillator 62, the output signal of which is provided to transmitting transducer $T_x$ by means of gate 64 and amplifier 66. Pulse generator 68 provides the necessary pulse signals to gate 64 so that the oscillator signals are gated and periodically projected.

The output signal from receiver transducer $T_1$ is provided to the positive inputs of respective summing amplifiers 70 and 71. The output of receiving transducer $T_2$ is provided to a positive input of summing amplifier 70 and to a negative input of summing amplifier 71 such that amplifier 70 provides a sum signal while amplifier 71 provides a difference signal of the transducer outputs.

The phase of the sum and difference signals may then be detected, and if the relationship is as in FIGS. 4A or 4B, then it is known that no target is present. One way of accomplishing this is by multiplying the sum signal times the difference signal in multiplier 74 and then filtering the resultant by means of low pass filter 76. Assuming the signals are sine wave signals, low pass filter 76 performs the function of integrating a sine times a cosine (90° out of phase as in FIGS. 4A or 4B) with the resultant signal being zero, indicative of the lack of a target or the presence of a first return from a target (pulses 42, 42' of FIG. 7). A path 2/path 3 return from a target resulting in a sum and difference signal having a phase relationship as in FIG. 6C, will not provide a zero output signal, and thus will indicate the presence of a target. In order that the output signal not be dependent upon target strength, the circuit of FIG. 9 includes means for normalizing the output signal. This may be accomplished with the provision of a squaring circuit 78 operable to square the sum signal which is then filtered by means of low pass filter 80 and provided to division circuit 82 which functions to divide the output of low pass filter 76 by the filtered squared sum signal.

A display 84 is provided to visually indicate the presence of a target and in a practical system which may include objectionable noise, a threshold circuit 86 may be provided such that when the output signal provided by division circuit 82 attains a predetermined level, an alarm or similar device may be activated to alert the operator.

I claim:

1. Apparatus for detecting targets on or above the bed of a body of water, comprising:
    A) acoustic transmitter means operable to periodically project a pulse of acoustic energy toward a target area of said bed;
    B) first and second receiver transducers positioned to receive acoustic energy reflected back from said target area, as a result of said projection, and operable in response thereto to provide corresponding respective first and second output signals;
    C) circuit means for deriving, from said first and second output signals, respective sum and difference signals;
    D) means for phase detecting said sum and difference signals; and
    E) means responsive to said phase detection for providing an output signal indicative of the presence of a possible target.

2. Apparatus according to claim 1 wherein said means for phase detecting includes:
    A) a multiplier operable to multiply said sum signal times said difference signal and provide an output indicative thereof; and
    (B) first low pass filter means for filtering said output of said multiplier.

3. Apparatus according to claim 1 which includes:
    A) means for normalizing said output signal indicative of the presence of a possible target.

4. Apparatus according to claim 3 wherein said means for normalizing includes:
    A) a squaring circuit operable to square said sum signal and provide an output indicative thereof;
    B) second low pass filter means for filtering said output of said squaring circuit; and
    C) a divider circuit operable to divide the output of said first low pass filter by the output of said second low pass filter.

5. Apparatus according to claim 1 which includes:
    A) means for displaying said output signal indicative of the presence of a possible target.

6. Apparatus according to claim 1 which includes:
    A) means for providing an alarm if said output signal indicative of the presence of a possible target exceeds a certain threshold value.

* * * * *